United States Patent
Moore et al.

(10) Patent No.: US 9,557,406 B2
(45) Date of Patent: Jan. 31, 2017

(54) METHOD, SYSTEM, AND SOFTWARE FOR SUPPORTING MULTIPLE RADAR MISSION TYPES

(71) Applicant: Raytheon Command and Control Solutions LLC, Fullerton, CA (US)

(72) Inventors: Alan B. Moore, Fullerton, CA (US); Charles G. Kristenson, Costa Mesa, CA (US); Randy A. Wild, Fullerton, CA (US)

(73) Assignee: Raytheon Command and Control Solutions LLC, Fullerton, CA (US)

(*) Notice: Subject to any disclaimer, the term of this patent is extended or adjusted under 35 U.S.C. 154(b) by 591 days.

(21) Appl. No.: 14/103,147

(22) Filed: Dec. 11, 2013

(65) Prior Publication Data

US 2016/0223642 A1 Aug. 4, 2016

Related U.S. Application Data

(60) Provisional application No. 61/846,845, filed on Jul. 16, 2013.

(51) Int. Cl.
*G01S 7/02* (2006.01)
*G01S 13/88* (2006.01)
(Continued)

(52) U.S. Cl.
CPC .................. *G01S 7/02* (2013.01); *G01S 13/88* (2013.01); *H01Q 3/02* (2013.01); *G01S 2013/0272* (2013.01)

(58) Field of Classification Search
CPC .... G01S 7/02; G01S 13/88; G01S 2013/0272; G01S 13/723; G01S 13/726; G01S 7/003; H01Q 3/02; F41H 13/00; G05D 1/0088; G06F 8/71; G06F 9/44505
(Continued)

(56) References Cited

U.S. PATENT DOCUMENTS

| | | | |
|---|---|---|---|
| 5,317,319 A | * | 5/1994 | Fagarasan .............. G01S 13/66 342/195 |
| 5,675,748 A | | 10/1997 | Ross |

(Continued)

FOREIGN PATENT DOCUMENTS

| | | | |
|---|---|---|---|
| AU | 646 167 B2 | 2/1994 | |
| IL | EP 2610636 A1 * | 7/2013 | ........... G01S 13/726 |

(Continued)

OTHER PUBLICATIONS

Notification Concerning Transmittal of International Preliminary Report on Patentability (Chapter 1 of the Patent Cooperation Treaty) and Written Opinion, PCT/US2014/045678, date of mailing Jan. 28, 2016, 10 pages.

(Continued)

*Primary Examiner* — John B Sotomayor
(74) *Attorney, Agent, or Firm* — Daly, Crowley, Mofford & Durkee, LLP

(57) ABSTRACT

A radar system is provided that uses configurable radar control software. The radar system may continually adapt over time to perform different types of radar mission by re-configuring the radar control software with mission specific configuration data. A configuration database may be provided to store the configuration data for retrieval during mission transition operations.

19 Claims, 3 Drawing Sheets

(51) Int. Cl.
*H01Q 3/02* (2006.01)
*G01S 13/02* (2006.01)

(58) Field of Classification Search
USPC .............................. 342/175, 13, 95–97, 195
See application file for complete search history.

(56) References Cited

U.S. PATENT DOCUMENTS

| | | | |
|---|---|---|---|
| 5,751,609 A * | 5/1998 | Schaefer, Jr. | G01P 5/00 700/38 |
| 6,704,864 B1 | 3/2004 | Philyaw | |
| 6,744,379 B1 | 6/2004 | Aker et al. | |
| 7,307,583 B1 | 12/2007 | Woodell et al. | |
| 7,536,394 B1 * | 5/2009 | Gryparis | G06Q 10/06 |
| 7,551,988 B1 | 6/2009 | Wichgers et al. | |
| 7,808,422 B1 | 10/2010 | Woodell et al. | |
| 8,098,192 B1 | 1/2012 | Wichgers et al. | |
| 8,384,585 B2 | 2/2013 | Nohara et al. | |
| 8,604,963 B1 | 12/2013 | Kronfeld et al. | |
| 9,070,236 B1 * | 6/2015 | DiEsposti | G07C 5/0808 |
| 9,103,628 B1 * | 8/2015 | Moraites | F41G 7/2293 |
| 9,116,227 B2 | 8/2015 | Lee et al. | |
| 9,291,707 B2 | 3/2016 | Nohara et al. | |
| 9,354,633 B1 | 5/2016 | McCusker et al. | |
| 2003/0120624 A1 | 6/2003 | Poppenga et al. | |
| 2003/0213358 A1 * | 11/2003 | Harding | G01S 7/22 89/1.11 |
| 2004/0068415 A1 * | 4/2004 | Solomon | G05D 1/0088 89/1.11 |
| 2004/0073360 A1 | 4/2004 | Foxlin | |
| 2005/0060527 A1 | 3/2005 | Philyaw | |
| 2005/0264438 A1 | 12/2005 | Fullerton et al. | |
| 2006/0112119 A1 * | 5/2006 | Vian | G07C 5/085 |
| 2008/0077616 A1 * | 3/2008 | Davidson | G05D 1/0077 |
| 2008/0150787 A1 * | 6/2008 | Cummings | G01S 7/003 342/59 |
| 2008/0211708 A1 | 9/2008 | Haberland et al. | |
| 2008/0297396 A1 * | 12/2008 | Dark | G01S 7/021 342/14 |
| 2009/0085797 A1 | 4/2009 | Wise et al. | |
| 2009/0100995 A1 * | 4/2009 | Fisher | B64D 1/04 89/1.11 |
| 2009/0102703 A1 | 4/2009 | Mohamadi et al. | |
| 2009/0224956 A1 * | 9/2009 | Dark | G01S 7/021 342/13 |
| 2010/0042988 A1 | 2/2010 | Lundin et al. | |
| 2010/0191698 A1 | 7/2010 | Tyler | |
| 2011/0202278 A1 | 8/2011 | Caute et al. | |
| 2012/0139786 A1 | 6/2012 | Puzella et al. | |
| 2013/0053653 A1 | 2/2013 | Cuddihy et al. | |
| 2013/0293406 A1 * | 11/2013 | Herman | F41H 3/00 342/20 |
| 2014/0097979 A1 * | 4/2014 | Nohara | G01S 7/003 342/90 |
| 2015/0025927 A1 * | 1/2015 | Hershey | G06Q 10/063112 705/7.14 |
| 2015/0026662 A1 * | 1/2015 | Moore | G06F 8/71 717/121 |
| 2016/0223642 A1 * | 8/2016 | Moore | G01S 7/02 |

FOREIGN PATENT DOCUMENTS

| | | | | |
|---|---|---|---|---|
| KR | 20120126512 A * | 11/2012 | | G06F 19/00 |
| KR | 101254082 B1 * | 4/2013 | | G06F 19/00 |
| SE | EP 1772747 A1 * | 4/2007 | | G01S 13/723 |
| WO | WO 2006/110973 A1 | 10/2006 | | |
| WO | WO 2015/009526 A1 | 1/2015 | | |
| WO | WO 2015/050610 A2 | 4/2015 | | |

OTHER PUBLICATIONS

Notification Concerning Transmittal of International Preliminary Report on Patentability (Chapter 1 of the Patent Cooperation Treaty) and Written Opinion, PCT/US2014/046105, date of mailing Jan. 28, 2016, 8 pages.
Notification of Transmittal of the International Search Report and the Written Opinion of the International Searching Authority, or the Declaration, PCT/US2014/045678, date of mailing Apr. 9, 2015, 5 pages.
Written Opinion of the International Searching Authority, PCT/US2014/045678, date of mailing Apr. 9, 2015, 9 pages.
Smith C A ED—Institute of Electrical and Electronics Engineers: "The B-2 radar", Improving Systems Effectiveness in the Changing Environment of the 90's. Anaheim, Sep. 24-26, 1991; [Proceedings of the Systems Readiness Technology Conference. (AUTOTESTCON)], New York, IEEE, US, vol. -, Sep. 24, 1991, pp. 17-33, XP010036867, DOI: 10.1109/AUTEST.1991.197526. ISBN: 978-0-87942-576-0, p. 17-p. 20; figures 1-3.
Emery et al.: "The operation and performance of a multi-frequency HF Surfacewave Radar", RADAR Conference, 2008. RADAR '08. IEEE, IEEE, Piscataway, NJ, USA, May 26, 2008, pp. 1-6, XP031376212, ISBN: 978-1-4244-1538-0, sec. 3.2.
"Section 6 APG 502 Radar (NASARR)", Jan. 31, 2012, pp. 2-6-1-2-6-14, XP055178948, Retrieved from the Internet: URL:http://www.classicjetsims.com/sownloads/Radar.pdf [retrieved on Mar. 24, 2015], the whole document.
Lambert: "F-104G Starfighter European Production of Systems", Flight International, vol. 83, No. 2818, Mar. 14, 1963, pp. 368-377, XP055178924, sec. Nasarr, figs. On pp. 371-372.
Antonik P. et al.: "Integrated end-to-end radar processing using knowledge-based control", Record of the 1999 IEEE Radar Conference. Waltham, MA Apr. 20-22, 1999; [IEEE Radar Conference], New York NY: IEEE, US, Apr. 20, 1999, pp. 256-261, XP000895757, ISBN: 978-0-7803-4978-0, sec. Introduction, Knowledge-Based Control; figures 3,4.
Aloi et al. "Software Defined Radar: synchronization issues and practical implementation", CogART 2011, International Conference on Cognitive Radio and Advanced Spectrum Management, Barcelona, Spain, Oct. 26-29, 2011; 5 pages.
Whisnant, et al.; "A new model for dynamically reconfigurable software;" IBM Systems Journal; vol. 42; No. 1; Jan. 2003, 15 pages.
Robert O'Donnell, "Radar System Enginneering", IEEE, 2010, <http://ece.wpi.edu/radarcourse/Radar%202010%20PDFs/Radar%202009%20A_9%20Antennas%202.pdf>, pp. 1-70.
Salamone; "Electric Software Distribution: Diamond in the Rough;" 8178 Data Communications International; No. 4; Mar. 22, 1993; 5 pages.
PCT Search Report of the ISA for PCT/US2014/046105 dated Oct. 16, 2014.
PCT Written Opinion of the ISA for PCT/US2014/046105 dated Oct. 16, 2014.
Whisnant, et al.; "A system model for dynamically reconfigurable software;" IBM Systems Journal; vol. 42; No. 1; Jan. 2003.
Australian Application No. 2014329980 Patent Examination Report No. 1 dated Jul. 7, 2016, 3 pages.
Australian Examination Report dated Sep. 28, 2016; for Australian Pat. App. No. 2014290599; 3 pages.
Australian Response filed on Dec. 7, 2016 to Examination Report dated Jul. 7, 2016; for Australian Pat. App. No. 2014329980; 42 pages.

* cited by examiner

METHOD, SYSTEM, AND SOFTWARE FOR SUPPORTING MULTIPLE RADAR MISSION TYPES

CROSS REFERENCE TO RELATED APPLICATION

The present application claims the benefit of U.S. Provisional Patent Application No. 61/846,845 filed on Jul. 16, 2013, which is hereby incorporated by reference herein in its entirety.

BACKGROUND

As is well known, a radar system is a system that derives information about a remote target by directing radio frequency (RF) signals (e.g., RF pulses, etc.) toward the target and analyzing the return energy that results from reflection of the transmitted signals from the target. Radar systems may have different missions or roles that may each involve different types of targets or threats. Radar missions may include, for example, air surveillance or defense missions; weapon locating or counterfire missions; fire control missions; space surveillance missions; surface surveillance missions; weather determination missions, and others. Targets or threats associated with different radar missions may include, for example, aircraft threats, weapon or ballistic threats, aircraft or ballistic targets; spacecraft targets; ship targets; ground vehicle targets, and others. Each of these threats or targets can have many variations and may be associated with corresponding optimizations or tailoring for different radar missions. For example, aircraft threats may involve fixed wing aircraft, rotary wing aircraft, large or small aircraft, fast or slow aircraft, bombers, fighters, unmanned aerial vehicles (UAVs), and others. Ballistic targets may include, for example, rockets, mortar shells, and/or various sized artillery each having different speeds and sizes.

Different threat properties may pose different challenges to a radar that can best be met by employing different radar configurations. Different radar configurations may include, for example, fixed (stationary) versus rotating antennas; fast, medium, or slow update rates (target revisit rates); gapped, tight, or overlapping beam coverage; small versus large acquisition search areas; different radar "modes" designed to best detect specific types of targets; different digital data links between radar and command/control systems depending upon mission; and/or others.

Techniques are needed that are capable of supporting a variety of different radar mission types and/or modes in a radar in an efficient manner.

SUMMARY

In accordance with one aspect of the concepts, systems, circuits, and techniques described herein, a method is provided for use in operating a radar system that is capable of performing a plurality of different radar mission types. More specifically, the method comprises: determining a mission type to be performed by the radar system; retrieving a configuration file from a configuration database that is associated with the identified mission type, the configuration database including configuration files associated with a plurality of different mission types; and using configuration information from the retrieved configuration file to configure re-configurable radar control software associated with the radar system to perform a mission having the identified mission type.

In one embodiment, using configuration information within the retrieved configuration file to configure re-configurable radar control software to perform a mission having the identified mission type includes using the configuration information to adapt one or more common radar functions in the radar control software for use with the identified mission type.

In one embodiment, the method further comprises repeatedly performing the actions of determining, retrieving, and using to adapt the radar control software as new missions are performed.

In one embodiment, determining a mission type includes receiving a mission type indication from a radar operator.

In one embodiment, determining a mission type includes automatically determining a mission type using software algorithms and software inputs such as external system requests or cues, target characteristics, environmental conditions, rotating or cycling between several different missions, mission transitions induced by logic or measurement results from prior missions, and other inputs and processes.

In some embodiments, determining a mission type includes determining a mission type by sensing the hardware configuration.

In accordance with another aspect of the concepts, systems, circuits, and techniques described herein, a radar system that is capable of performing a plurality of different mission types comprises: one or more digital processors to execute radar control software to control one or more functions of the radar system, the radar control software being configurable to perform different types of radar missions for the radar system; and a database storing configuration data for use in configuring the radar control software, the database having different configuration files that are associated with different radar mission types; wherein the one or more digital processors are configured to retrieve configuration data from the database based, at least in part, on a type of radar mission to be currently performed by the radar system and to adapt one or more modules or functions of the radar control software using the configuration data retrieved from the database.

In one embodiment, the database includes a single configuration file for each type of radar mission supported by the radar system.

In one embodiment, the database includes a group of configuration files for each type of radar mission supported by the radar system.

In one embodiment, the radar system includes a single radar control software program to control all supported mission types.

In one embodiment, the radar system further comprises an antenna having one or more motors to controllably rotate or slew the antenna in one or more dimensions, wherein the database includes first configuration data associated with a first mission type to configure the radar control software to control the radar with the antenna rotating and second configuration data associated with a second mission type to configure the radar control software to control the radar with the antenna held stationary.

In one embodiment, the database includes first configuration data associated with a first mission type to configure the radar control software to operate the radar at a first target update rate and second configuration data associated with a second mission type to configure the radar control software to operate the radar at a second, different target update rate.

In one embodiment, the database includes first configuration data associated with a first mission type to configure the radar control software to detect a first type of target and second configuration data associated with a second mission type to configure the radar control software to detect a second type of target that is different from the first type of target.

In one embodiment, the database includes first configuration data associated with a first mission type to configure the radar control software to scan a large acquisition search area and second configuration data associated with a second mission type to configure the radar control software to scan a small acquisition search area.

In accordance with still another aspect of the concepts, systems, circuits, and techniques described herein, an article is provided that comprises a non-transitory computer readable medium or media having the following stored thereon: configurable radar control software to control operation of an associated radar system when executed by a computer system of the radar system, the configurable radar control software having a plurality of modules or functions for performing basic radar tasks that can be adapted to different types of radar missions using configuration data; and computer instructions that, when executed by the computer system of the radar system, operate to: determine a type of mission to be performed by the radar system, retrieve configuration data from a database based on the type of mission, and adapt at least one of the plurality of modules or functions of the configurable radar control software using the retrieved configuration data.

In one embodiment, the non-transitory computer readable medium or media also has a plurality of configuration files stored thereon that each correspond to a particular radar mission type, each of the plurality of configuration files including configuration data to adapt one or more of the plurality of modules or functions of the configurable radar control software to perform a corresponding mission type.

In one embodiment, the non-transitory computer readable medium or media includes first configuration data associated with a first mission type to configure the configurable radar control software to rotate an antenna about one or more axes and second configuration data associated with a second mission type to configure the configurable radar control software to hold the antenna stationary.

In one embodiment, the non-transitory computer readable medium or media includes first configuration data associated with a first mission type to configure the configurable radar control software to operate the radar at a first target update rate and second configuration data associated with a second mission type to configure the configurable radar control software to operate the radar at a second, different target update rate.

In one embodiment, the non-transitory computer readable medium or media includes first configuration data associated with a first mission type to configure the configurable radar control software to detect a first type of target and second configuration data associated with a second mission type to configure the configurable radar control software to detect a second type of target that is different from the first type of target.

In one embodiment, the non-transitory computer readable medium or media includes first configuration data associated with a first mission type to scan a large acquisition search area and second configuration data associated with a second mission type to configure the configurable radar control software to scan a small acquisition search area.

BRIEF DESCRIPTION OF THE DRAWINGS

The foregoing features may be more fully understood from the following description of the drawings in which.

DETAILED DESCRIPTION

Figure 1:
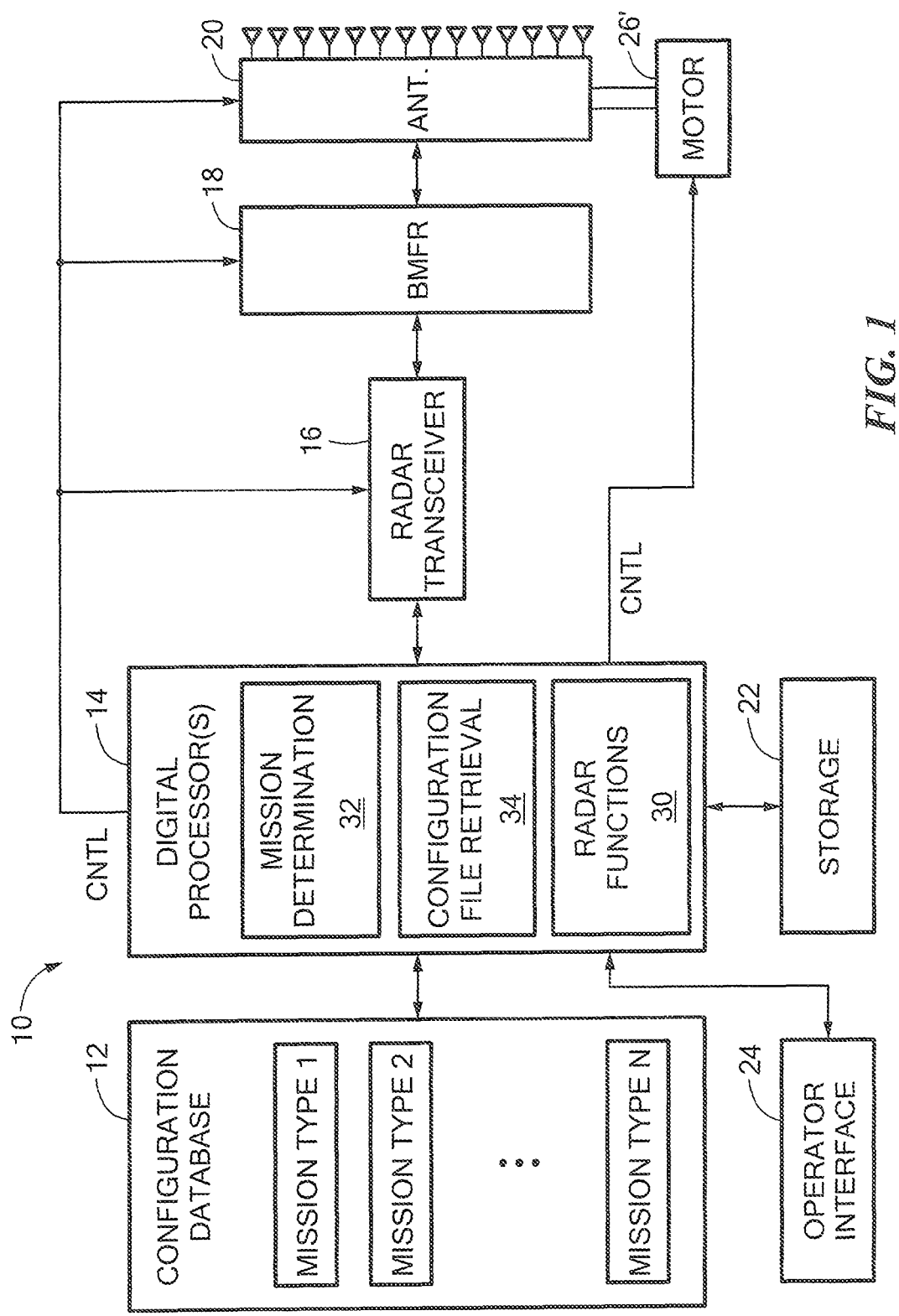
FIG. 1 is a block diagram illustrating an exemplary radar system in accordance with an embodiment.

A radar system typically includes hardware (e.g., an antenna subsystem, an RF transceiver, etc.) to perform a particular type of radar mission. One or more digital processors are also typically provided within a radar system to execute radar control software to operate the corresponding hardware. If it is desired to perform other types of radar missions using the same system hardware, separate control programs have traditionally been provided to support each type of mission. When switching between mission types in such a radar system, the software associated with the new mission type would need to be loaded into memory associated with the digital processor(s) of the system. The delay involved in loading the new software program into memory could present problems in the radar system. For example, one or more targets could go undetected during this delay period.

In developing the concepts, systems, and techniques described herein, it was appreciated that most radar systems rely on the same basic principles of operation, regardless of the mission or function being performed. Thus, in some embodiments, radar systems are provided that use radar control software that is designed to implement basic radar principles separate from the details associated with different missions, functions, or configurations. The details of the different missions, functions, or configurations are then provided in separate configuration files or file combinations that are stored within the radar system or are accessible therefrom. Using this approach, a single software control program may be used within a radar system that can be continually re-configured based on changing radar mission types.

By using a single software program within a radar system that is capable of supporting different mission types through adaptation, delays involved in transitioning between software programs may be significantly reduced. That is, re-configuring an already loaded software program can be performed in much less time than loading new software. In some embodiments, the single software program may include one or more modules, subroutines, and/or functions that are capable of identifying a radar mission that needs to be performed by a corresponding radar system and retrieving configuration information from a configuration database that is associated therewith. This information may then be used to configure the underlying control software for use in performing the identified mission.

As used herein, the term "configuration database" is used in the broad sense to include any collection of stored data that may be used to configure radar control software based on radar mission and/or threat configuration. The term is not meant to be limited to any particular database standard or database management system. As used herein, the phrases "mission type" and "radar mission type" are used to indicate any type of mission, mode, environment, threat or target detection, and/or operating configuration to be performed in a radar that may require specific control software characteristics.

As described above, the use of a single software program to support multiple mission types through adaptation, may reduce delays typically associated with transitions between different mission types. Other advantages may include, for example, avoidance of costs associated with the maintenance of multiple software products; reduction in the likelihood of introducing errors associated maintaining multiple software baselines; reduction in software and system quality and performance verification times since common software functions require less mission specific verification; an increase in the speed of operational changes between different hardware configurations (e.g., air surveillance with rotating antenna or counter-ballistic with fixed antenna); improvements and fixes for software associated with one radar being readily shared with other radars/applications; the ability to quickly apply knowledge and expertise associated with one radar to support other radar applications; and the ability to re-use software products for other radars. Other advantages also exist.

FIG. 1 is a block diagram illustrating an exemplary radar system 10 in accordance with an embodiment. As shown, the radar system 10 includes: a configuration database 12, one or more digital processors 14, a radar transceiver 16, an adjustable beamformer 18, a single or multi-aperture antenna 20, digital storage 22, an operator interface 24, and one or more motors 26. The digital processor(s) 14 are operative for controlling the operation of the various components of the radar system 10. To do this, radar control software is loaded into the digital processor(s) 14. The digital processor(s) 14 may also execute an operating system program and/or one or more other programs. The digital storage 22 is operative for storing digital data and/or programs for the radar system 10. The radar transceiver 16 is operative for generating radio frequency (RF) transmit signals during transmit operations and for processing RF return signals during receive operations. Although illustrated as a single unit, the radar transceiver 16 may be implemented as a separate and/or distributed radar transmitter and radar receiver in some embodiments. The radar transceiver 16 may include digital to analog conversion circuitry and analog to digital conversion circuitry to facilitate communication with the processor(s) 14.

The beamformer 18 may be used to generate and steer one or more beams associated with the antenna and may optionally include advanced characteristics such as multiple, simultaneous, monopulse, subarray, multiple-input-multiple-output, and/or other radar beamforming capabilities 20. The antenna 20 may be used to transmit RF signals into free space during transmit operations and receive RF signals from free space during receive operations. Duplexer circuitry may be provided to allow a transmitter and receiver to share a single antenna 20. In some embodiments, separate or multiple transmit and receive antennas may be provided. The operator interface 24 provides an interface between the radar system 10 and one or more radar operators. The one or more motors 26 may be used to rotate or slew the antenna 20 about an axis during some or all radar missions. As shown, the radar transceiver 16, the beamformer 18, the antenna 20, and the motor 26 may controlled by the digital processor(s) 14.

The configuration database 12 is operative for storing configuration information for use in configuring radar control software loaded within the digital processor(s) 14 to perform different types of radar missions. For each different mission type, the configuration database 12 may include a configuration file or a collection of files that may be used to configure the control software. As shown in FIG. 1, during operation, the processor(s) 14 may have control software 30 loaded within a corresponding memory for performing a number of different radar functions. The control software 30 may include code for performing basic radar functions without regard to the specifics of individual radar missions. The processor(s) 14 may also have mission determination code 32 loaded therein that allow the processor(s) 14 to determine a type of radar mission to be performed by the radar system 10 at some point in time (e.g., in the near future). In addition, the processor(s) 14 may have configuration information retrieval code 34 loaded therein that allows the processor(s) 14 to retrieve configuration information from the database 12 that is associated with the radar mission identified by the mission determination code 32.

The configuration information retrieval code 34 may also be operative for configuring the control software 30 with the retrieved configuration information. For each different type of radar mission supported, different control details may be provided for configuring the software to control one or more components of the radar system 10. This may include, for example, whether or not to rotate or slew the antenna 20 using the motor 26, the speed and direction to use to rotate the antenna 20, when and how to schedule radar resources such as search and track beams, how to scan and form the transmit and/or receive beams using beamformer 18, what size beam to use, what type of transmit signal and waveform to use, how to process return signals, how to identify and discriminate targets of interest from undesired signals and noise, how to respond to targets and undesired signals, how to track and communicate data with external interfaces and systems, and so on. Some other adaptation variables that may be used include adaptation information related to the clutter environment, adaptations related to the types of weapons available, adaptations related to the availability of other nearby sensors for mission support, etc. The control information retrieved from the configuration database 12 should include all information necessary to adapt portions of the control code 30 for use in performing an identified mission type.

It should be appreciated that the radar system 10 of FIG. 1 represents one example of a radar system architecture that may be used in an embodiment. Many other hardware configurations may be alternatively be used. For example, some hardware configurations may use antenna types that do not require a beamformer. Other configurations may not require an operator interface (e.g., an autonomous radar, etc.), and so on. The different control parameters that are changed from mission type to mission type will typically be implementation specific.

The configuration database 12 may be stored in any type of non-volatile digital data storage device, structure, or system. This may include, for example, hard disks, optical disks, compact disc read only memories (CD-ROMs), magneto-optical disks, read only memories (ROMs), erasable programmable ROMs (EPROMs), electrically erasable programmable ROMs (EEPROMs), magnetic or optical cards, flash memory, and/or other types of non-volatile storage media. In some embodiments, a separate file may be stored for each different radar mission type. In some other embodiments, a separate folder may be provided for each mission type that includes multiple configuration files associated with the mission type. Other techniques for organizing the configuration data in the database 12 may alternatively be used.

The digital processor(s) 14 may include any type of digital processing device that is capable of controlling the various radar system components for all of the different mission types. This may include, for example, a general purpose microprocessor, a digital signal processor (DSP), a reduced instruction set computer (RISC), a complex instruction set computer (CISC), an application specific integrated circuit (ASIC), a microcontroller, an embedded controller, a multi-core processor, a Field Programmable Gate Array (FPGA), a Graphic Processing Unit (GPU), a processor complex, and/or others, including combinations of the above. In various embodiments, techniques and systems described herein may be implemented using any combination of hardware, software, and firmware.

The antenna 20 may include any type of antenna system that is capable of performing radar functions. This may include, for example, a single-faced stationary phased array, a multi-faced stationary phased array, a single-faced or multi-faced rotating phased array, a gimbaled dish antenna, a horn antenna, and/or others. In some embodiments, operating specifics of the antenna 20 will be controlled based on the configuration information used to configure the control software for a particular type of radar mission. As described previously, in some embodiments, separate transmit and receive antennas may be provided along with separate transmit and receive channels. Beamformer circuitry may be optional based on the type of antenna used and may optionally include advanced characteristics such as multiple, simultaneous, monopulse, subarray, multiple-input-multiple-output, digital, and/or other radar beamforming capabilities.

Figure 2:
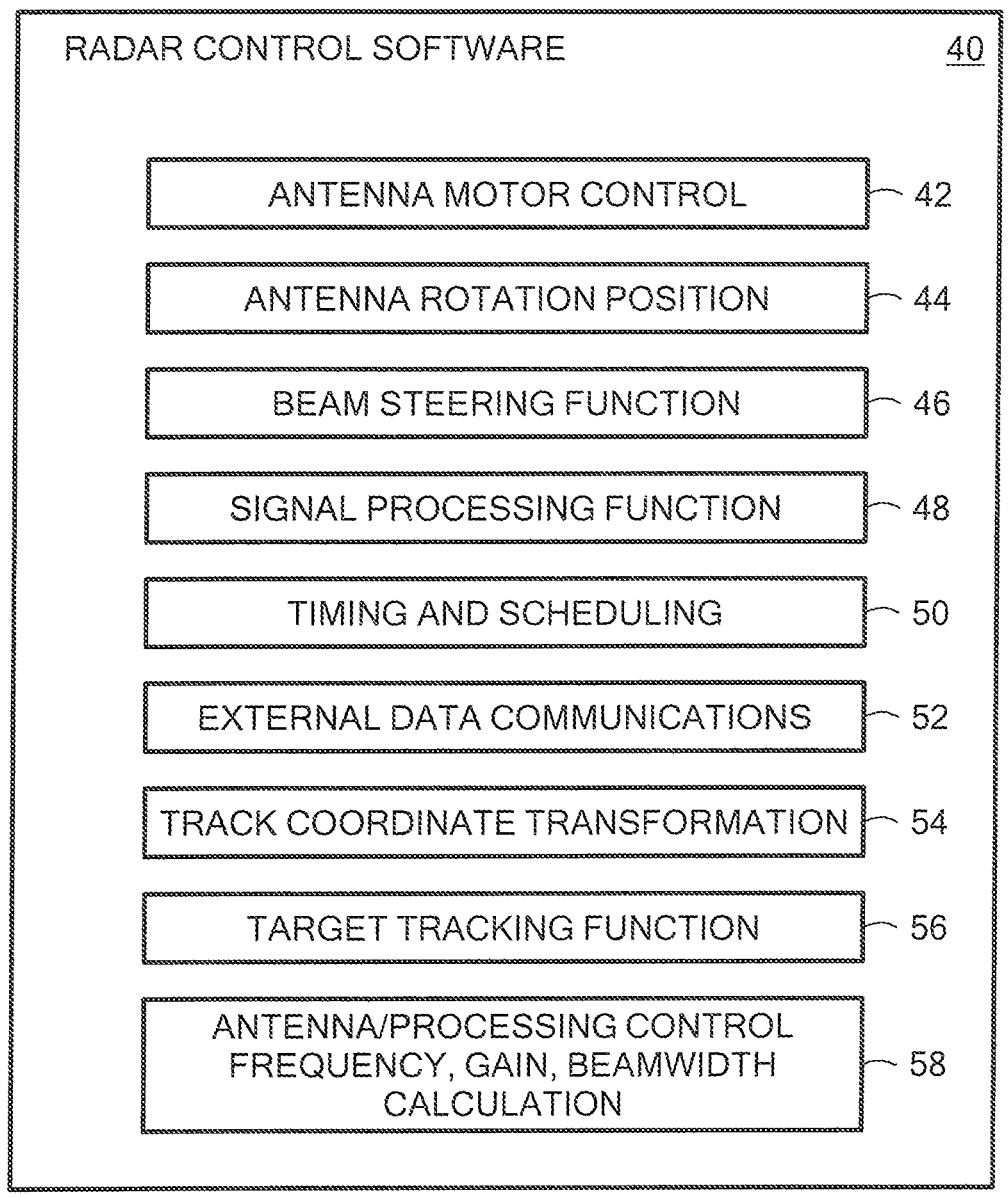
FIG. 2 is a diagram illustrating radar functions that may be performed by configurable radar control software in accordance with an embodiment.

The radar control software 30 of FIG. 1 may include code for performing any number of different radar functions within the radar system 10. The functions that are included may depend, for example, on the types of missions that will be supported by the radar system 10. FIG. 2 is a diagram illustrating exemplary radar functions that may be performed by configurable radar control software 40 in an embodiment. As shown, the software 40 may include: an antenna control module 42, an antenna rotation position module 44, a beam steering module 46, a signal processing module 48, a timing and scheduling module 50, an external data communications module 52, a track coordinate transformation module 54, a target tracking module 56, and an antenna/processing control module 58. Any one or more of these different modules/functions may be configurable using configuration information from the configuration database 12. Other modules/functions may be provided within radar control software in other embodiments.

Figure 3:
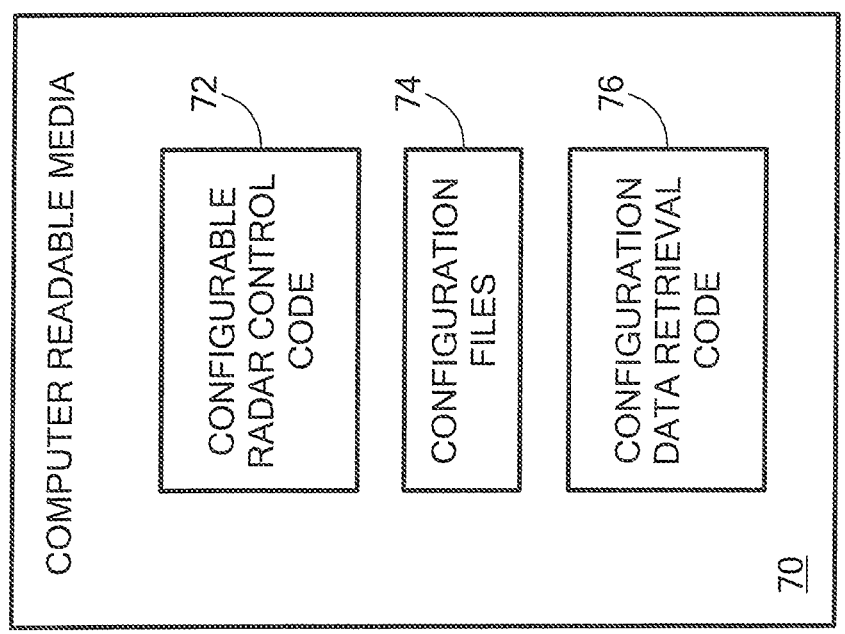
FIG. 3 is a diagram illustrating a non-transitory computer readable medium or media in accordance with an embodiment.

In some embodiments, configurable radar control software may be packaged and sold as a software product. As shown in FIG. 3, a non-transitory computer readable medium or media 70 may be provided having the configurable radar control code 72 stored thereon. In addition, the computer readable medium or media 70 may also have code 76 stored thereon for use in retrieving configuration data from a configuration database based on radar mission type. In some implementations, the computer readable medium or media 70 may also have the configuration data 74 stored thereon that is needed to support the various radar mission types to be performed. The computer readable medium or media 70 may be sold to or otherwise provided to end users as a packaged product.

Once acquired, an end user may install the configurable radar control software 72 and the configuration data retrieval code 76 from the computer readable medium or media 70 into a corresponding radar system. If present, the end user may also save the configuration data stored on the medium 70 to an appropriate database unit of the radar system (e.g., configuration database 12 of FIG. 1, etc.). Because the control software 72 is able to support multiple radar mission types for the corresponding radar system, the system may only require a single control program to control all supported mission types. In some embodiments, new mission types may subsequently be added to a system by acquiring and storing new configuration data within the database for the new mission type. In this way, new control software will not be needed to support new or modified mission types.

If changes need to be made to the installed software after installation, only a single program needs to be modified, instead of a separate control program for each type of supported mission. Changes may be implemented in the radar by software update or by installing a new version of the software. As only one program needs to be changed/replaced, software modifications in the radar can be performed relatively quickly. Likewise, the burden on the software provider is significantly reduced by only having to provide a single update rather than numerous different updates.

Figure 4:
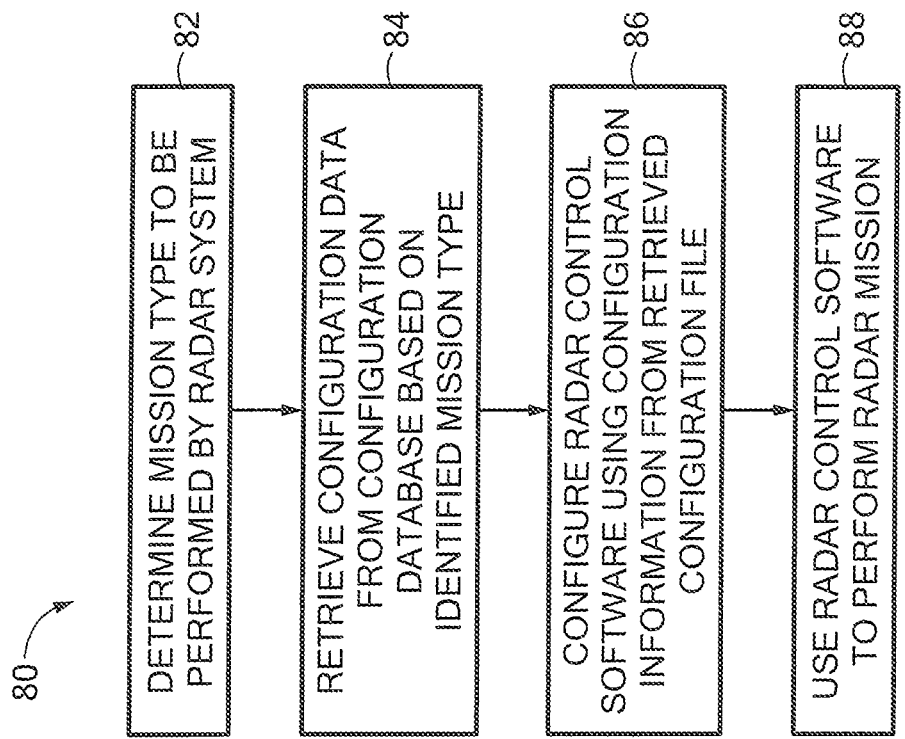
FIG. 4 is a flow diagram illustrating a method for operating a radar system in accordance with an embodiment.

FIG. 4 is a flow diagram showing a process for operating a radar system in accordance with an embodiment.

The rectangular elements (typified by element 82 in FIG. 4) are herein denoted "processing blocks" and may represent computer software instructions or groups of instructions. It should be noted that the flow diagram of FIG. 4 represents one exemplary embodiment of a design described herein and variations in such a diagram, which generally follow the process outlined, are considered to be within the scope of the concepts, systems, and techniques described and claimed herein.

Alternatively, the processing blocks may represent operations performed by functionally equivalent circuits such as a digital signal processor circuit, an application specific integrated circuit (ASIC), or a field programmable gate array (FPGA). Some processing blocks may be manually performed while other processing blocks may be performed by a processor. The flow diagram does not depict the syntax of any particular programming language. Rather, the flow diagram illustrates the functional information one of ordinary skill in the art requires to fabricate circuits and/or to generate computer software to perform the processing required of the particular apparatus. It should be noted that many routine program elements, such as initialization of loops and variables and the use of temporary variables may not be shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIG. 4 can be performed in any convenient or desirable order.

Referring now to FIG. 4, a mission type to be performed by a radar system may first be determined (block 82). In some embodiments, a radar mission type may be determined by using software to select the new mission in response to data received from external systems or interfaces or determined automatically by the radar software in response to operating conditions. In other embodiments, the mission type may be received as input from a radar operator. In still other embodiments, mission type may be determined, at least in part, by sensing a hardware configuration of the radar system. Other techniques for determining radar mission type may additionally or alternatively be used. Once a radar mission type has been identified, configuration data corresponding to the mission type is retrieved from a configuration database (block 84). The configuration data may be included within a configuration file or folder of the configuration database that is associated with the corresponding radar mission type. The radar control software may then be configured using the retrieved configuration data (block 86). This may involve, for example, adding appropriate values to the control software; activating or deactivating specific modules or subroutines of the control software; modifying detection and signal processing algorithms and coefficients; adjusting search patterns or update rates; modifying the radar resource allocation and scheduling functions; changing beamforming or waveforms; switching in alternative tracking filters and discrimination logic; communicating with auxiliary subsystems such as positioning and orientation devices, the motor controller(s), or adjunct sensors such as electro-optical or Secondary Surveillance-IFF subsystems; and/or performing any other tasks necessary to customize the control software to the radar mission type of interest. After the radar control software has been modified, the software may be used to perform the radar mission of interest (block 88). Examples of such missions may include air defense, surface defense, missile and ballistic missile defense, point defense, air traffic control, weather monitoring, air surveillance, space surveillance, surface surveillance, threat warning, kill assessment, weapon location, fire control, target or environment imaging (such as by Synthetic Aperture Radar), target acquisition, terrain mapping, environmental survey, sensor and weapon registration, and any other missions performed by radar and sensor systems. This process can be continually repeated during operation of the radar system as different types of missions are performed.

Although embodiments are described above where a radar system includes only a single reconfigurable control software program, it should be appreciated that other embodiments exist where a radar system may include multiple configurable control programs. For example, in some embodiments, a radar system may include multiple configurable control programs where each program controls a different set of radar mission types. In these embodiments, transitions between mission types in different groups will require a new control program to be loaded while transitions between mission types within a common group will not.

As used herein, the phrase "configured to," when used in connection with a processor or computer, is intended to cover any processor or computer that is specially adapted to perform a corresponding task or function. This may include, for example, a reconfigurable hardware device (e.g., an FPGA, a PLA, etc.) that is configured with configuration information to perform the task or function. It may also include, for example, a programmed or programmable processor or processors that have associated software to perform the task or function. As such, a reconfigurable or programmable unit is considered "configured to" perform a particular task or function if it has access to a memory or storage device having information or software that is capable of carrying out the task or function when loaded into the reconfigurable or programmable unit.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for use in operating a radar system that is capable of performing a plurality of different types of radar missions, comprising:
   determining, by one or more digital processors of the radar system, a mission type to be performed by the radar system;
   retrieving, by the one or more digital processors, a configuration file from a configuration database that is associated with the identified mission type, the configuration database including configuration files associated with a plurality of different mission types; and
   using, by the one or more digital processors, configuration information from the retrieved configuration file to configure reconfigurable radar control software associated with the radar system to perform a mission having the identified mission type.

2. The method of claim 1, wherein:
   using, by the one or more digital processors, configuration information within the retrieved configuration file to configure, by the one or more digital processors, reconfigurable radar control software to perform a mission having the identified mission type includes using the configuration information to adapt one or more common radar functions in the radar control software for use with the identified mission type.

3. The method of claim 1, further comprising:
   repeating, by the one or more digital processors, the steps of determining, retrieving, and using as new missions are performed by the radar system.

4. The method of claim 1, wherein:
   determining a mission type includes receiving, by the one or more digital processors, a mission type indication from a radar operator.

5. The method of claim 1, wherein:
   determining a mission type includes sensing a hardware configuration of the radar system by the one or more digital processors.

6. A radar system that is capable of performing a plurality of different types of missions, comprising:
   one or more digital processors to execute radar control software to control one or more functions of the radar system, the radar control software being configurable to perform different types of radar missions for the radar system; and
   a database storing configuration data for use in configuring the radar control software the database having different configuration files that are associated with different radar mission types;
   wherein the one or more digital processors are configured to retrieve configuration data from the database based, at least in part, on a type of radar mission to be performed by the radar system and to adapt one or more modules or functions of the radar control software using the configuration data retrieved from the database.

7. The radar system of claim 6, wherein:
   the database includes a single configuration file for each type of radar mission supported by the radar system.

8. The radar system of claim 6, wherein:
the database includes a group of configuration files for each type of radar mission supported by the radar system.

9. The radar system of claim 6, wherein:
the radar system includes a single radar control software program to control all supported mission types.

10. The radar system of claim 6, further comprising:
an antenna having one or more motors to controllably rotate or slew the antenna in one or more dimensions;
wherein the database includes first configuration data associated with a first mission type to configure the radar control software to control the radar with the antenna rotating and second configuration data associated with a second mission type to configure the radar control software to control the radar with the antenna held stationary.

11. The radar system of claim 6, wherein:
the database includes first configuration data associated with a first mission type that configures the radar control software to operate the radar at a first target update rate and second configuration data associated with a second mission type that configures the radar control software to operate the radar at a second, different target update rate.

12. The radar system of claim 6, wherein:
the database includes first configuration data associated with a first mission type that configures the radar control software to detect a first type of target and second configuration data associated with a second mission type that configures the radar control software to detect a second type of target that is different from the first type of target.

13. The radar system of claim 6, wherein:
the database includes first configuration data associated with a first mission type that configures the radar control software to scan a large acquisition search area and second configuration data associated with a second mission type that configures the radar control software to scan a small acquisition search area.

14. An article comprising a non-transitory computer readable medium or media having the following stored thereon:
configurable radar control software to control operation of an associated radar system when executed by a computer system of the radar system, the configurable radar control software having a plurality of modules or functions for performing basic radar tasks that can be adapted to different types of radar missions using configuration data; and
computer instructions that, when executed by the computer system of the radar system, operate to: determine a type of mission to be performed by the radar system, retrieve configuration data from a database based on the type of mission, and adapt at least one of the plurality of modules or functions of the configurable radar control software using the retrieved configuration data.

15. The article of claim 14, wherein:
the non-transitory computer readable medium or media has a plurality of configuration files stored thereon that each correspond to a particular radar mission type, each of the plurality of configuration files including configuration data to adapt one or more of the plurality of modules or functions of the configurable radar control software to perform a corresponding mission type.

16. The article of claim 15, wherein:
the non-transitory computer readable medium or media includes first configuration data associated with a first mission type to configure the configurable radar control software to rotate an antenna about an axis and second configuration data associated with a second mission type to configure the configurable radar control software to hold the antenna stationary.

17. The article of claim 15, wherein:
the non-transitory computer readable medium or media includes first configuration data associated with a first mission type to configure the configurable radar control software to operate the radar at a first target update rate and second configuration data associated with a second mission type to configure the configurable radar control software to operate the radar at a second, different target update rate.

18. The article of claim 15, wherein:
the non-transitory computer readable medium or media includes first configuration data associated with a first mission type to configure the configurable radar control software to detect a first type of target and second configuration data associated with a second mission type to configure the configurable radar control software to detect a second type of target that is different from the first type of target.

19. The article of claim 15, wherein:
the non-transitory computer readable medium or media includes first configuration data associated with a first mission type to scan a large acquisition search area and second configuration data associated with a second mission type to configure the configurable radar control software to scan a small acquisition search area.

* * * * *